United States Patent Office 3,463,178
Patented Aug. 26, 1969

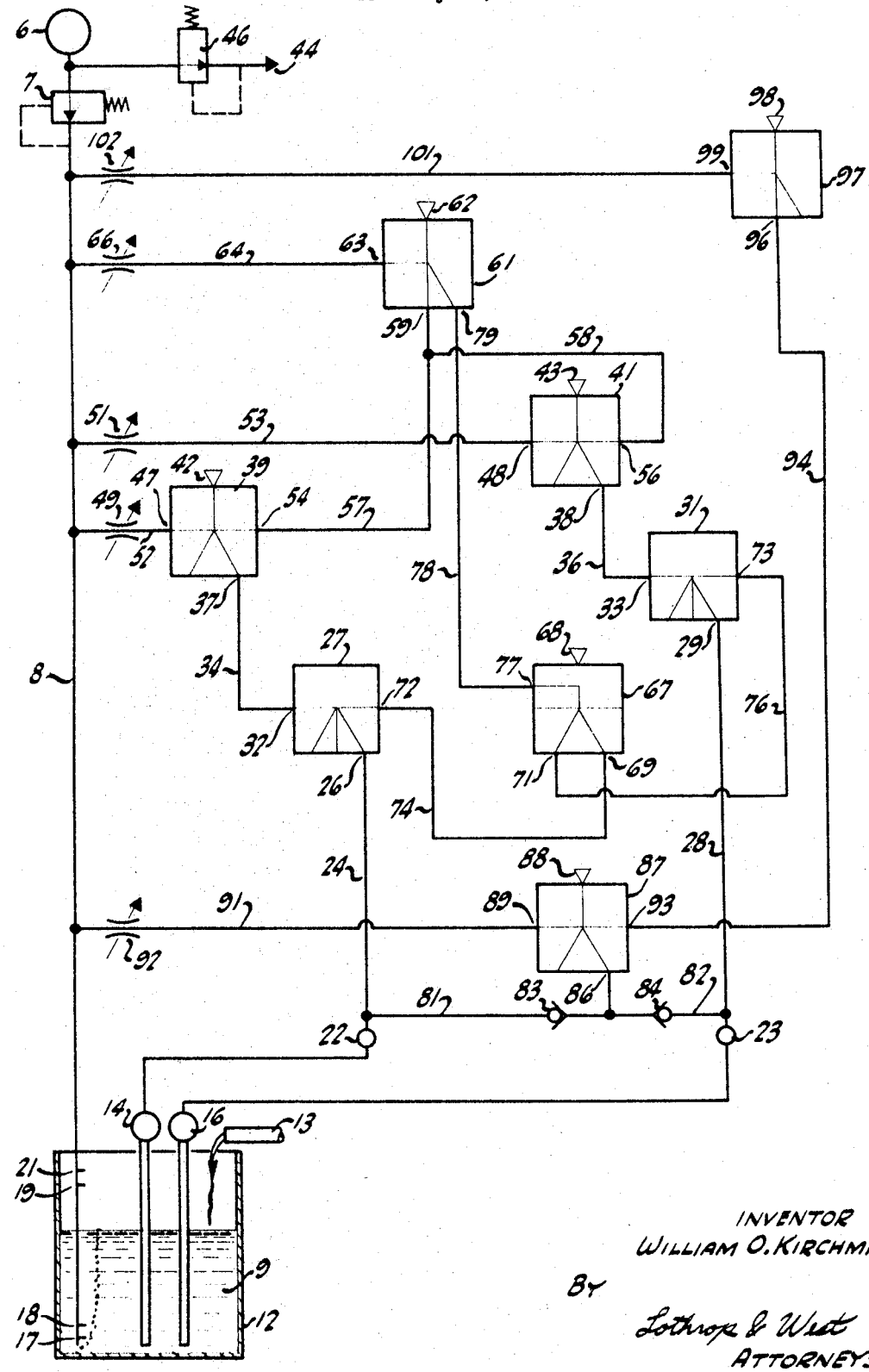

3,463,178
LIQUID LEVEL CONTROLLER
William O. Kirchmier, San Ramon, Calif., assignor to
The Rucker Company
Filed May 12, 1967, Ser. No. 638,000
Int. Cl. G05d 9/04; F15c 3/00
U.S. Cl. 137—81.5      3 Claims

ABSTRACT OF THE DISCLOSURE

A liquid level controller for a vessel containing liquid has a bubbler tube level sensor acting through a logic circuit comprised of fluid-actuated amplification devices for controlling a pump connected to withdraw liquid from the vessel.

---

My invention relates to liquid level controllers and in particular to liquid level controllers utilizing a sensing mechansm wherein a fluid passing through a tube escapes into a body of liquid from one end of the tube submerged in the liquid. Varying pressure of the fluid in the tube is a measure of the varying level of liquid in the body. The pressure variation in the tube is used by various fluid-actuated amplifiers to control a pump or pumps for changing the liquid level.

In controllers for liquid levels, such as wet wells in sewage systems, where pumps are used to remove the liquid from its container, it is advantageous not to allow the pumps to run continuously, thereby increasing pump life, saving power and perhaps preventing a loss of pump prime if the container is pumped dry. Furthermore, the normal method of sewage treatment requires that the raw sewage be allowed to sand for some period while it is decomposed by bacterial action. Accordingly, a sensing means is generally provided for starting the pumps when the liquid reaches a certain high level and for stopping the pumps when a certain low level is reached. Several pumps are frequently provided so that if one pump does not have a pumping speed sufficient to keep up with the influx of liquid other pumps may be started to help out. The several pumps may also be alternated in successive pumping cycles so as to cause the pumps to wear more evenly.

One such sensing means utilizes a tube, one end of which is connected to a source of pressurized fluid such as an air compressor and the other end of which is submerged in the liquid, the level of which is to be measured, to a depth lower than the desirable low level of the liquid. The fluid is supplied at a pressure sufficient to cause it to pass out of the tube and into the liquid so that the fluid pressure in the tube is a measure of the level of the liquid. To translate fluid pressures in the tube into signals for starting and stopping the pumps, for starting and stopping any additional pumps, and for alternating pumps in successive cycles, a logic circuit is generally interposed between the sensor and the pumps. Through exposure to contaminants in the atmosphere or to the liquid to be pumped, which may be caustic, mechanical and electrical components can fail through corrosion. Furthermore, moving parts as in relays may wear out and relay contacts can fail through continued use.

It is thus an object of my invention to provide a liquid level controller utilizing a logic circuit which is not exposed to the ambient atmosphere.

Another object of my invention is to provide a liquid level controller utilizing a logic circuit which is not exposed to the liquid whose level is to be controlled.

Another object of my invention is to provide a liquid level controller utilizing a logic circuit containing no moving parts.

Another object of my invention is to provide a liquid level controller utilizing a logic circuit which is not extrical relays.

Another object of my invention is to provide a more reliable liquid level controller.

Still another object of my invention is to provide a generally improved liquid level controller.

Other objects together with the foregoing are set forth in the embodiment of the invention described in the accompanying description and illustrated in the accompanying drawing, which is a schematic diagram of a liquid level controller embodying my invention.

The many variants on the liquid level controller which may be designed utilizing my invention all contain logic circuits composed of fluid-actuated amplification devices. Many different types of these devices, usually called "fluid amplification devices," are available, and they have been cataloged by the National Fluid Power Association. In the publication of the National Fluid Power Association Project Group T3.7.2, dated Jan. 20, 1967, a uniform system of terminology and symbology is set forth. The drawing, specification and claims of this application correspond to this system as closely as possible.

Mechanism

In the embodiment of the invention set forth in the drawing, five types of fluid amplification devices may be utilized. The first of these is an active NOT device. The active NOT device receives fluid such as air under pressure from a source, such as a compressor, through a power input or supply and discharges the received pressure fluid through an output. The active NOT device also has a control input. If pressure fluid of a certain threshold strength, called a signal, is received at the control input, pressure fluid from the power input will be diverted to waste from the output and does not pass through the output for the duration of the control pressure signal.

The second of these fluid amplification devices is an active NOR inclusive OR device. This device is similar to the active NOT device except that pressure fluid from the power input is diverted not to waste but to an additional output when a control signal is received at the control input. When there is no control signal, outflow is through the NOR output. When there is an input signal outflow is through the OR output.

The third of these fluid amplification devices is an active bistable flip-flop. This has a power input, two outputs and two opposed control inputs. In the absence of a fluid pressure signal at both of the control inputs, the pressure fluid from the power input will pass through only one of the outputs by virtue of the Coanda effect. Both outputs are stable. Pressure fluid will continue to pass through that output into which it is diverted by a momentary fluid pressure signal at one of the control inputs until a momentary fluid pressure signal at the other control input changes the flow to the other output.

The fourth of these fluid amplification devices is a passive AND device. Having no power input, it receives no fluid pressure from the source. Rather, it has three outputs and two control inputs. Pressure fluid received by the device through the first control input only passes out through the first output only. Similarly, pressure fluid received by the device through the second control input only passes out through the second output only. However, pressure fluid received through the first and second control inputs simultaneously all passes out of the device through the third output only.

The fifth of these fluid amplification devices is an active binary counter. Like the active flip-flop device, it receives pressure fluid from the source through a power input and transmits through only one of a pair of outputs at a time. Also like the flip-flop device, the binary counter has a pair of opposed control inputs, signals into either determining outflow from the corresponding one of the two outputs. Unlike the flip-flop, however, the binary counter has a third control input called a count control input into which a fluid pressure signal above a threshold valve but of any momentary duration will divert pressure fluid from the output through which it is passing and into the other one.

In the preferred embodiment of the invention schematically displayed in the drawing, pressurized fluid, which may conveniently be air, is supplied by a source 6 such as an air compressor. The fluid flows through a regulator 7 to maintain a selected output pressure and into one end of a bubbler tube 8. The other end of the bubbler tube 8 is submerged in a liquid 9, whose level is to be controlled, in a container 12. The container 12 may conveniently be the wet well of a sewage system and the liquid 9 raw sewage. The liquid 9 is supplied to the container 12 by suitable means 13, such as the drain pipe of a sewage system. Pumping means, which in the present embodiment are two pumps 14 and 16 of conventional design, are provided to remove the liquid 9 from the container 12.

Various liquid levels are of importance in different instances. In this case certain levels are preselected. These are a low level 17, an intermediate level 18, a high level 19 and an extra-high level 21. The bubbler tube 8 is submerged in the liquid 9 to a depth below the low level 17. The selected air pressure is sufficient to displace all of the liquid 9 from the bubbler tube 8 when the level of the liquid 9 is above the extra-high level 21 and to pass out of the tube 8 and bubble to the surface of the liquid 9. The pressure of the fluid in the bubbler tube 8 is a measure of the level of the liquid 9.

Pressure sensitive switches 22 and 23 of conventional design are connected one to each of the pumps 14 and 16. Each of these pressure sensitive switches 22 and 23 serves to start its own pump when it is activated by fluid pressure and stop that pump when the fluid pressure ceases. Connected to the bubbler tube 8 are means for activating the pressure sensitive switches 22 and 23 including a logic circuit composed of fluid amplification devices, variable resistances, check valves and suitable connecting means such as tubes for transmitting fluid pressure between these components.

Within this logic circuit, activating fluid pressure is supplied to the first pressure sensitive switch 22 by a tube 24 from the first output 26 of a first passive AND device 27. Similarly, a tube 28 supplies fluid pressure to the second pressure sensitive switch 23 from the first output 29 of a second passive AND device 31. The first control inputs 32 and 33 of the first and second passive AND devices 27 and 31 receive pressure fluid respectively through tubes 34 and 36 from the first outputs 37 and 38 of first and second active flip-flop devices 39 and 41. As with each of the other active devices in the logic circuit, the power inputs 42 and 43 of the first and second active flip-flop devices 39 and 41 receive pressure fluid through suitable means (not shown) connected to a terminal 44 which in turn receives fluid pressure from the source 6 through a pressure regulator 46. The first control inputs 47 and 48 of the first and second active flip-flop devices 39 and 41 are connected to the bubbler tube 8 respectively through first and second variable resistances 49 and 51 by tubes 52 and 53. The variable resistances 49 and 51 are adjusted respectively so that the first and second active flip-flop devices 39 and 41 will just respond when the liquid 9 in the container 12 is at the high level 19.

The second control inputs 54 and 56 of the first and second active flip-flop devices 39 and 41 receive pressure fluid through tubes 57 and 58 which join and are connected to the NOR output 59 of an active NOR inclusive OR device 61. The power input 62 of this device is connected by suitable means (not shown) to the terminal 44. The control input 63 of the active NOR inclusive OR device 61 receives pressure fluid from the bubbler tube 8 through a tube 64 and a third variable resistance 66. This is adjusted so that the active NOR inclusive OR device 61 will just respond when the liquid 9 in the container 12 is at the low level 17.

As a memory device to determine which of the two pumps 14 and 16 will operate during any given cycle, the logic circuit is provided with an active binary counter 67. This device receives pressure fluid through its power input 68 from the terminal 44. The two outputs 69 and 71 of the counter 67 supply pressure fluid respectively to the second control inputs 72 and 73 of the first and second passive AND devices 27 and 31 through tubes 74 and 76. The count control input 77 of the counter 67 receives fluid pressure through a tube 78 from the OR output 79 of the active NOR inclusive OR device 61.

Fluid pressure is also supplied to the first and second pressure sensitive switches 22 and 23 through tubes 81 and 82 connected to check valves 83 and 84 and then joined to connect to the first output 86 of a third active flip-flop device 87. The check valves 83 and 84 will only conduct pressure fluid from the third active flip-flop device 87 to the pressure sensitive switches 22 and 23 and thus serve to isolate the switches 22 and 23 from each other. The power input 88 of this device similarly receives its pressure fluid from the terminal 44. The first control input 89 of the device 87 receives pressure fluid from the bubbler tube 8 through a tube 91 and a fourth variable resistance 98. The fourth variable resistance 92 is adjustable so that the third active flip-flop device 87 will just respond when the liquid 9 in the container 12 is at the extra-high level 21.

The second control input 93 of the third active flip-flop device 87 receives pressure fluid through a tube 94 from the output 96 of an active NOT device 97. The power input 98 of this device similarly receives pressure fluid from the terminal 44. Pressure fluid is supplied to the control input 99 of the active NOT device 97 from the bubbler tube 8 through a tube 101 and a fifth variable resistance 102. The fifth variable resistance 102 is adjustable so that the active NOT device 97 will just respond when the liquid 9 in the container 12 is at the intermediate level 18.

Operation

When the liquid 9 in the container 12 is below the low level 17, the pressure in the bubbler tube 8 is correspondingly low and the active NOT device 97, active NOR inclusive OR device 61 and first, second and third active flip-flop devices 39, 41 and 87, respectively, receive no signals from the bubbler tube 8 through the tubes 52 and 53. The active NOR inclusive OR device 61 is transmitting pressure fluid through its NOR output 59 and the tubes 57 and 58 to the second control inputs 54 and 56 of the first and second active flip-flop devices 39 and 41. Since the first control inputs 47 and 48 are receiving no pressure signals, the first and second active flip-flop devices 39 and 41 are not transmitting pressure fluid through their first outputs 37 and 38 to the first control inputs 32 and 33 of the first and second passive AND devices 27 and 31. Accordingly, no pressure fluid passes through the first outputs 26 and 29 of the first and second passive AND devices 27 and 31 to the pressure sensitive switches 22 and 23. The active binary counter 67 is transmitting pressure fluid through one of its two outputs 69 and 71, depending upon which of the two pumps 14 and 16 operated during the last cycle. Assuming that the first output 69 is transmitting pressure fluid, corresponding to the use of the second pump 16 in the last cycle, the second control input 72 of the first passive AND device 27 is receiving a pressure signal. No pressure fluid is passing through the first output 26 of this device to the first pressure switch 22. Finally, the active NOT device 97 is transmitting pressure through its output 96 to the second control input 93 of the third active flip-flop device 87 since the control input 99 of the active NOT device 97 is receiving no pressure signal from the bubbler tube 8. The first control input 89 of the third active flip-flop device 87 is receiving no pressure signal from the bubbler tube 8 and does not transmit pressure fluid through its first output 86 to the pressure sensitive switches 22 and 23 and the pumps 14 and 16 are not operating.

When the liquid 9 in the container 12 rises above the low level 17, a pressure signal through the tube 64 reaches the control input 63 of the active NOR inclusive OR device 61, diverting pressure out of the NOR output 59 and into the OR output 79. Accordingly, the second control inputs 54 and 56 of the first and second active flip-flop devices 39 and 41 no longer receive pressure signals from the NOR output 59, but the active binary counter 67 does receive a pressure signal at its count control input 77 from the OR output 79. The active binary counter 67 thus switches its pressure signal through the second output 71 to the second control input 73 of the second passive AND device 31 and no longer sends a pressure signal to the second control input 72 of the first passive AND device 27 through the first output 69.

When the liquid 9 in the container 12 rises above the high level 19, the first and second active flip-flop devices 39 and 41 receive pressure signals from the bubbler tube 8 at their first control inputs 47 and 48. Accordingly, these two devices both divert pressure fluid through their first outputs 37 and 38 to the first control inputs 32 and 33 of the first and second passive AND devices 27 and 31. Because it is receiving a pressure signal at its second control input 73 from the second output 71 of the active binary counter 67, the second passive AND device 31 will still transmit no pressure through its first output 29 to the second pressure sensitive switch 23. However, the first passive AND device 27 receives no such pressure signal at its second control input 72 so it does transmit pressure fluid through its first output 26 to the first pressure sensitive switch 22, thereby starting the first pump 14.

When the liquid 9 in the container 12 again drops below the high level 19, the first and second active flip-flop devices 39 and 41 no longer receive pressure signals from the bubbler tube 8 at their first control inputs 47 and 48.

When the liquid 9 in the container 12 finally drops below the low level 17 again, the active NOR inclusive OR device 61 no longer receives a pressure signal from the bubbler tube 8 at its control input 63. Accordingly, it no longer transmits pressure fluid through its OR output 79 to the count control input 77 of the active binary counter 67, but begins transmitting pressure fluid through its NOR output 59 to the second control inputs 54 and 56 of the first and second active flip-flop devices 39 and 41. These two flip-flop devices 39 and 41 divert pressure flow from their first outputs 37 and 38, and the first and second passive AND devices 27 and 31 no longer receive pressure signals at their first control inputs 32 and 33. The first passive AND device 27 no longer receives pressure fluid to transmit through its first output 26 to the first pressure sensitive switch 22, and the pump 14 stops.

The entire system thus has returned to the same state it was in before the cycle began, except that the active binary counter 67, serving as a memory element and remembering that the first pump 14 operated during the last cycle, is transmitting pressure fluid through its second output 71 to the second control input 73 of the second passive AND device 31, rather than through its first output 69 to the second input 72 of the first passive AND device 27 as before. Thus the next cycle will be just like the last except that the second passive AND device 31 will transmit pressure fluid through its first output 29 to the second pressure sensitive swich 23, thereby starting the second pump 16; the first passive AND device 27 will not transmit pressure through its first output 26 to the first pressure sensitive switch 22, thereby not starting the first pump 14; and the active binary counter 67 will be returned to transmitting pressure through its first output 69 rather than its second output 71 as when the first cycle began.

If the liquid 9 in the container 12 continues to rise after the first pump 14 has started, the extra-high level 21 is reached. Since the intermediate level 18 would have been reached previously, the active NOT device 97 received a pressure signal from the bubbler tube 8 at its control input 99. Accordingly, it does not transmit a pressure signal through its output 96 to the second control input 93 of the third active flip-flop device 87. Thus when the extra-high level 21 is reached, the third active flip-flop device 87 receives a pressure signal from the bubbler tube 8 at its first control input 89, and it diverts pressure fluid through its first output 86 to the pressure sensitive switches 22 and 23. The second pump 16, not running, is thus started to help out the first pump 14. When the liquid 9 in the container 12 then drops below the extra-high level 21 again, the third active flip-flop device 87 no longer receives a pressure signal through its first control input 89 from the bubbler tube 8. When the intermediate level 18 is reached, the pressure signal from the bubbler tube 8 to the control input 99 of the active NOT device 97 stops. The active NOT device 97 accordingly returns to transmitting pressure fluid through its output 96 and the tube 94 to the second control input 93 of the third active flip-flop device 87. This in turn diverts pressure fluid out of its first output 86 so that the second pressure sensitive switch 23 no longer receives pressure through the tube 82, and the second pump 16 stops.

What is claimed is:

1. A liquid level controller for use with a container having low, intermediate, high and extra-high liquid levels therein, which comprises:
    (a) means for supplying liquid to said container;
    (b) means including a pair of pumps for pumping said liquid from said container;
    (c) a source of pressurized fluid;
    (d) means receiving fluid from said source for varying the pressure of said fluid in accordance with the level of said liquid in said container;
    (e) and means sensitive to said fluid pressure for operating said pumping means in response thereto; said operating means including a pair of pressure sensitive switches each adapted to control a respective one of said pumps, a pair of fluid actuated amplification devices each adapted to actuate a respective one of said pressure switches, and a fluid actuated binary counter adapted to supply pressure fluid from said source alternately to each of said fluid amplification devices.

2. A liquid level controller as in claim 1 in which
    said pumps are electrically driven, said pressure sensitive switches are electrical and are connected one to each of said pumps, and said operating means includes: connections to start a predetermined one of said pumps by supplying pressure fluid to said pressure sensitive electrical switch connected thereto when said liquid is at said high level and to stop said one of said pumps by diverting said pressure fluid from said pressure sensitive electrical switch when said fluid is at said low level; and includes connections to start the other of said pumps by supplying pressure fluid to the other pressure sensitive electrical switch connected thereto when said liquid is at said extra-high level and to stop said other pump by diverting said supply of pressure fluid from said other pressure sensitive electrical switch when said liquid is at said intermediate level.

3. A liquid level controller as in claim 1 in which
    said fluid actuated devices are arranged to provide:
    a first active NOR inclusive OR device having a power input, an OR output, a NOR output and a control input in which a fluid pressure signal will divert pressure fluid from said power input away from said NOR output and into said OR output for the duration of said signal; means for connecting said power input of said first device to said source; means for connecting said control input of said first device to said pressure sensitive means for a low level signal; first and second active flip-flop devices each having a power input, an output, a first control input in which a pressure fluid signal will divert fluid from said power input into said output for an indefinite period, and a second control input in which a pressure fluid signal will divert fluid from said power input away from said output for an indefinite period; means for connecting said power inputs of said flip-flop devices to said source; means for connecting said first control inputs of said flip-flop devices to said pressure sensitive means for a high level signal; means for connecting said second control inputs of said flip-flop devices to said NOR output of said active NOR inclusive OR device; first and second passive AND devices each having an output, a first control input and a second control input, pressure fluid from said first control input passing through said output unless pressure fluid is also received through said second control input; means for connecting said first control input of said first passive AND device to said output of said first active flip-flop device; means for connecting said first control input of said second passive AND device to said output of said second active flip-flop device; means for connecting said outputs of said passive AND devices to said pressure sensitive means; a binary counter having a power input, two outputs and a count control input in which a fluid pressure signal diverts pressure fluid from said power input away from one of said outputs and into the other of said outputs for an indefinite period; means for connecting said power input of said binary counter to said source; means for connecting said outputs of said binary counter one to each of said second inputs of said first and second passive AND devices; means for connecting said count control input of said binary counter to said OR output of said active NOR inclusive OR device; an active NOT device having a power input, an output and a control input in which a fluid pressure signal will not allow pressure fluid to follow its normal path from said power input to said output; means for connecting said power input of said active NOT device to said source; means for connecting said control input of said active NOT device to said pressure sensitive means for response to said intermediate level; a third active flip-flop device having a power input, an output, a first control input in which a fluid pressure signal will divert pressure fluid away from said power input into said output for an indefinite period, and a second control input in which a fluid pressure signal will divert pressure fluid from said power input away from said output for an indefinite period; means for connecting said power input of said third active flip-flop device to said source; means for connecting said output of said third active flip-flop device to said pressure sensitive means for supplying pressure fluid thereto; means for connecting said first control input of said third active flip-flop device to said pressure sensitive means for response to said extra-high level; and means for connecting said second control input of said third active flip-flop device to said output of said active NOT device.

References Cited

UNITED STATES PATENTS

| | | | |
|---|---|---|---|
| 2,061,608 | 11/1936 | Beckwith et al. | 137—394 XR |
| 2,956,581 | 10/1960 | Pearson | 137—394 XR |
| 3,107,850 | 10/1963 | Warren et al. | 137—81.5 XR |
| 3,250,285 | 5/1966 | Vockroth | 137—81.5 |
| 3,277,914 | 10/1966 | Manion | 137—81.5 |
| 3,286,086 | 11/1966 | Bauer. | |
| 3,324,730 | 6/1967 | Bowles. | |
| 3,331,380 | 7/1967 | Schonfeld et al. | 137—81.5 |
| 3,340,885 | 9/1967 | Bauer | 137—81.5 |
| 3,342,197 | 9/1967 | Phillips | 137—81.5 |
| 3,360,002 | 12/1967 | Weis et al. | 137—394 XR |

SAMUEL SCOTT, Primary Examiner

U.S. Cl. X.R.

137—394; 235—201